US007657005B2

(12) United States Patent  (10) Patent No.: US 7,657,005 B2
Chang  (45) Date of Patent: Feb. 2, 2010

(54) SYSTEM AND METHOD FOR IDENTIFYING TELEPHONE CALLERS

(75) Inventor: Hisao M. Chang, Austin, TX (US)

(73) Assignee: AT&T Intellectual Property I, L.P., Reno, NV (US)

(*) Notice: Subject to any disclaimer, the term of this patent is extended or adjusted under 35 U.S.C. 154(b) by 18 days.

(21) Appl. No.: 10/979,784

(22) Filed: Nov. 2, 2004

(65) Prior Publication Data

US 2006/0093097 A1    May 4, 2006

(51) Int. Cl.
H04M 1/64    (2006.01)
(52) U.S. Cl. .............. 379/88.02; 370/352; 370/353; 370/354; 370/355; 370/356; 379/88.01; 379/142.05; 379/142.06; 379/211.01; 379/212.01; 379/213.01; 379/214.01; 379/265.02; 455/415; 455/417; 704/270; 704/270.1; 709/202
(58) Field of Classification Search ......... 370/351–356; 379/88.01–88.02, 142.05–142.06, 211.01, 379/212.01, 213.01, 214.01, 265.02; 455/415, 455/417; 709/202; 704/270–270.1
See application file for complete search history.

(56) References Cited

U.S. PATENT DOCUMENTS

| 4,696,028 | A | 9/1987 | Morganstein et al. |
|---|---|---|---|
| 4,788,715 | A | 11/1988 | Lee |
| 4,953,204 | A | 8/1990 | Cuschleg, Jr. et al. |
| 4,964,077 | A | 10/1990 | Eisen et al. |
| 4,967,405 | A | 10/1990 | Upp et al. |
| 5,042,006 | A | 8/1991 | Flohrer |
| 5,235,679 | A | 8/1993 | Yoshizawa et al. |
| 5,335,269 | A | 8/1994 | Steinlicht |
| 5,416,830 | A | 5/1995 | MacMillan, Jr. et al. |
| 5,455,903 | A | 10/1995 | Jolissaint et al. |
| 5,497,373 | A | 3/1996 | Hulen et al. |
| 5,522,046 | A | 5/1996 | McMillen et al. |
| 5,530,744 | A | 6/1996 | Charalambous et al. |
| 5,555,299 | A * | 9/1996 | Maloney et al. ........ 379/212.01 |

(Continued)

FOREIGN PATENT DOCUMENTS

EP    0 424 015 A2    4/1991

(Continued)

OTHER PUBLICATIONS

U.S. Appl. No. 10/898,722, filed Jul. 23, 2004.

(Continued)

*Primary Examiner*—Hemant Patel
(74) *Attorney, Agent, or Firm*—Toler Law Group

(57) ABSTRACT

A method of processing calls received at an interactive voice response (IVR) server is provided and includes receiving a telephone call at the IVR. Caller identity data that is associated with the telephone call is received and a customer profile that includes a list of individual names associated with the caller identity data is received. Each of the individual names is mapped to a speech recognition grammar pattern. Further, a caller of the telephone call is prompted to speak their name. A spoken name from the caller is received and recorded. Moreover, the spoken name is converted into a speech recognition grammar pattern. Thereafter, the speech recognition grammar pattern associated with the spoken name is compared to each of the speech recognition grammar patterns associated with the individual names retrieved from the customer profile.

21 Claims, 3 Drawing Sheets

U.S. PATENT DOCUMENTS

| | | | |
|---|---|---|---|
| 5,590,186 A | 12/1996 | Liao et al. | |
| 5,632,002 A | 5/1997 | Hashimoto et al. | |
| 5,652,789 A * | 7/1997 | Miner et al. | 379/201.01 |
| 5,754,639 A | 5/1998 | Flockhart et al. | |
| 5,754,978 A * | 5/1998 | Perez-Mendez et al. | 704/255 |
| 5,923,745 A | 7/1999 | Hurd | |
| 5,940,476 A * | 8/1999 | Morganstein et al. | 379/88.02 |
| 5,946,388 A | 8/1999 | Walker et al. | |
| 5,953,704 A | 9/1999 | McIlroy et al. | |
| 5,991,756 A | 11/1999 | Wu | |
| 5,995,979 A | 11/1999 | Cochran | |
| 5,999,965 A | 12/1999 | Kelly | |
| 6,002,689 A | 12/1999 | Christie et al. | |
| 6,002,760 A | 12/1999 | Gisby | |
| 6,003,011 A | 12/1999 | Sarin et al. | |
| 6,038,293 A | 3/2000 | McNerney et al. | |
| 6,038,305 A * | 3/2000 | McAllister et al. | 379/201.02 |
| 6,049,594 A * | 4/2000 | Furman et al. | 379/67.1 |
| 6,064,731 A | 5/2000 | Flockhart et al. | |
| 6,118,866 A | 9/2000 | Shtivelman | |
| 6,119,101 A | 9/2000 | Peckover | |
| RE37,001 E | 12/2000 | Morganstein et al. | |
| 6,173,266 B1 | 1/2001 | Marx et al. | |
| 6,173,289 B1 | 1/2001 | Sonderegger et al. | |
| 6,173,399 B1 | 1/2001 | Gilbrech | |
| 6,175,621 B1 | 1/2001 | Begeja | |
| 6,259,786 B1 | 7/2001 | Gisby | |
| 6,269,153 B1 | 7/2001 | Carpenter et al. | |
| 6,317,439 B1 | 11/2001 | Cardona et al. | |
| 6,333,980 B1 | 12/2001 | Hollatz et al. | |
| 6,353,608 B1 | 3/2002 | Cullers et al. | |
| 6,366,658 B1 | 4/2002 | Bjornberg et al. | |
| 6,366,668 B1 | 4/2002 | Borst et al. | |
| 6,381,329 B1 | 4/2002 | Uppaluru et al. | |
| 6,385,584 B1 | 5/2002 | McAllister et al. | |
| 6,389,400 B1 | 5/2002 | Bushey et al. | |
| 6,400,804 B1 | 6/2002 | Bilder | |
| 6,400,996 B1 | 6/2002 | Hoffberg et al. | |
| 6,405,159 B2 | 6/2002 | Bushey et al. | |
| 6,411,687 B1 * | 6/2002 | Bohacek et al. | 379/88.21 |
| 6,414,966 B1 | 7/2002 | Kulkarni et al. | |
| 6,418,424 B1 | 7/2002 | Hoffberg et al. | |
| 6,434,546 B1 | 8/2002 | Williamowski et al. | |
| 6,438,520 B1 * | 8/2002 | Curt et al. | 704/254 |
| 6,442,247 B1 | 8/2002 | Garcia | |
| 6,510,414 B1 * | 1/2003 | Chaves | 704/270 |
| 6,519,562 B1 | 2/2003 | Phillips et al. | |
| 6,526,126 B1 * | 2/2003 | Morganstein et al. | 379/88.02 |
| 6,529,871 B1 | 3/2003 | Kanevsky et al. | |
| 6,546,087 B2 | 4/2003 | Shaffer et al. | |
| 6,553,113 B1 * | 4/2003 | Dhir et al. | 379/265.02 |
| 6,570,967 B2 | 5/2003 | Katz | |
| 6,574,599 B1 * | 6/2003 | Lim et al. | 704/270 |
| 6,584,180 B2 * | 6/2003 | Nemoto | 379/88.01 |
| 6,587,556 B1 | 7/2003 | Judkins et al. | |
| 6,598,021 B1 | 7/2003 | Shambaugh et al. | |
| 6,598,136 B1 | 7/2003 | Norrod et al. | |
| 6,600,736 B1 * | 7/2003 | Ball et al. | 370/352 |
| 6,603,854 B1 | 8/2003 | Judkins et al. | |
| 6,614,781 B1 | 9/2003 | Elliott et al. | |
| 6,615,248 B1 | 9/2003 | Smith | |
| 6,631,186 B1 | 10/2003 | Adams et al. | |
| 6,662,163 B1 * | 12/2003 | Albayrak et al. | 704/275 |
| 6,678,360 B1 | 1/2004 | Katz | |
| 6,678,718 B1 | 1/2004 | Khouri et al. | |
| 6,690,788 B1 | 2/2004 | Bauer et al. | |
| 6,694,012 B1 | 2/2004 | Posthuma | |
| 6,697,460 B2 | 2/2004 | Knott et al. | |
| 6,700,972 B1 | 3/2004 | McHugh et al. | |
| 6,704,404 B1 | 3/2004 | Burnett | |
| 6,707,789 B1 | 3/2004 | Arslan et al. | |
| 6,714,631 B1 | 3/2004 | Martin et al. | |
| 6,714,643 B1 | 3/2004 | Gargeya et al. | |
| 6,721,416 B1 | 4/2004 | Farrell | |
| 6,731,722 B2 * | 5/2004 | Coffey | 379/88.01 |
| 6,738,082 B1 | 5/2004 | Dong et al. | |
| 6,738,473 B1 | 5/2004 | Burg et al. | |
| 6,744,861 B1 * | 6/2004 | Pershan et al. | 379/88.03 |
| 6,744,877 B1 | 6/2004 | Edwards | |
| 6,751,306 B2 | 6/2004 | Himmel et al. | |
| 6,757,306 B1 | 6/2004 | Klish, II et al. | |
| 6,766,320 B1 | 7/2004 | Wang et al. | |
| 6,775,359 B1 | 8/2004 | Ron et al. | |
| 6,778,643 B1 | 8/2004 | Bushey et al. | |
| 6,792,096 B2 | 9/2004 | Martin et al. | |
| 6,807,274 B2 | 10/2004 | Joseph et al. | |
| 6,823,307 B2 * | 11/2004 | Steinbiss et al. | 704/252 |
| 6,831,932 B1 | 12/2004 | Boyle et al. | |
| 6,832,224 B2 | 12/2004 | Gilmour | |
| 6,842,504 B2 | 1/2005 | Mills et al. | |
| 6,847,711 B2 | 1/2005 | Knott et al. | |
| 6,853,722 B2 | 2/2005 | Joseph et al. | |
| 6,853,966 B2 | 2/2005 | Bushey et al. | |
| 6,859,529 B2 | 2/2005 | Duncan et al. | |
| 6,871,212 B2 * | 3/2005 | Khouri et al. | 709/204 |
| 6,879,683 B1 | 4/2005 | Fain et al. | |
| 6,885,734 B1 | 4/2005 | Eberle et al. | |
| 6,891,932 B2 | 5/2005 | Bhargava et al. | |
| 6,895,083 B1 | 5/2005 | Bers et al. | |
| 6,901,366 B1 | 5/2005 | Kuhn et al. | |
| 6,907,119 B2 | 6/2005 | Case et al. | |
| 6,915,246 B2 | 7/2005 | Gusler et al. | |
| 6,922,689 B2 | 7/2005 | Shtivelman | |
| 6,925,155 B2 | 8/2005 | Reynolds et al. | |
| 6,963,983 B2 | 11/2005 | Munson et al. | |
| 6,964,023 B2 * | 11/2005 | Maes et al. | 715/811 |
| 6,970,554 B1 | 11/2005 | Peterson et al. | |
| 7,003,079 B1 | 2/2006 | McCarthy et al. | |
| 7,006,605 B1 * | 2/2006 | Morganstein et al. | 379/88.02 |
| 7,013,112 B2 | 3/2006 | Haller et al. | |
| 7,027,975 B1 | 4/2006 | Pazandak et al. | |
| 7,031,444 B2 | 4/2006 | Shen et al. | |
| 7,035,388 B2 * | 4/2006 | Kurosaki | 379/142.06 |
| 7,039,166 B1 * | 5/2006 | Peterson et al. | 379/88.18 |
| 7,062,505 B2 | 6/2006 | Lane et al. | |
| 7,065,201 B2 | 6/2006 | Bushey et al. | |
| 7,092,370 B2 | 8/2006 | Jiang et al. | |
| 7,095,827 B2 | 8/2006 | Guedalia | |
| 7,095,842 B2 | 8/2006 | Brown et al. | |
| 7,106,850 B2 | 9/2006 | Campbell et al. | |
| 7,184,534 B2 | 2/2007 | Birch et al. | |
| 7,200,614 B2 | 4/2007 | Reid et al. | |
| 7,245,711 B2 | 7/2007 | Margolis | |
| 2001/0011211 A1 | 8/2001 | Bushey et al. | |
| 2001/0018672 A1 | 8/2001 | Petters et al. | |
| 2001/0032229 A1 | 10/2001 | Hulls et al. | |
| 2001/0034662 A1 | 10/2001 | Morris | |
| 2002/0046030 A1 * | 4/2002 | Haritsa et al. | 704/256 |
| 2002/0049874 A1 | 4/2002 | Kimura | |
| 2002/0059169 A1 | 5/2002 | Quarterman et al. | |
| 2002/0067714 A1 | 6/2002 | Crain et al. | |
| 2002/0087385 A1 | 7/2002 | Vincent | |
| 2002/0133394 A1 | 9/2002 | Bushey et al. | |
| 2002/0133413 A1 | 9/2002 | Chang et al. | |
| 2002/0135618 A1 * | 9/2002 | Maes et al. | 345/767 |
| 2002/0156699 A1 | 10/2002 | Gray et al. | |
| 2002/0165732 A1 | 11/2002 | Ezzeddine et al. | |
| 2002/0188438 A1 | 12/2002 | Knight et al. | |
| 2002/0196277 A1 | 12/2002 | Bushey et al. | |
| 2003/0018659 A1 | 1/2003 | Fuks et al. | |
| 2003/0026409 A1 | 2/2003 | Bushey et al. | |
| 2003/0035381 A1 | 2/2003 | Chen et al. | |
| 2003/0069937 A1 | 4/2003 | Khouri et al. | |
| 2003/0097428 A1 | 5/2003 | Afkhami et al. | |

| | | | |
|---|---|---|---|
| 2003/0112956 A1* | 6/2003 | Brown et al. ............ 379/221.01 | |
| 2003/0130864 A1 | 7/2003 | Ho et al. | |
| 2003/0143981 A1 | 7/2003 | Kortum et al. | |
| 2003/0144846 A1 | 7/2003 | Denenberg et al. | |
| 2003/0144919 A1 | 7/2003 | Trompette et al. | |
| 2003/0156133 A1 | 8/2003 | Martin et al. | |
| 2003/0165223 A1 | 9/2003 | Timmins et al. | |
| 2003/0187732 A1 | 10/2003 | Seta | |
| 2003/0187773 A1 | 10/2003 | Santos et al. | |
| 2003/0194063 A1 | 10/2003 | Martin et al. | |
| 2003/0195753 A1 | 10/2003 | Homuth | |
| 2003/0202640 A1 | 10/2003 | Knott et al. | |
| 2003/0202643 A1 | 10/2003 | Joseph et al. | |
| 2003/0202649 A1 | 10/2003 | Haug, Jr. et al. | |
| 2003/0204435 A1 | 10/2003 | McQuilkin et al. | |
| 2003/0228007 A1* | 12/2003 | Kurosaki ............... 379/142.06 | |
| 2003/0235282 A1* | 12/2003 | Sichelman et al. ..... 379/201.03 | |
| 2004/0005047 A1 | 1/2004 | Joseph et al. | |
| 2004/0006473 A1 | 1/2004 | Mills et al. | |
| 2004/0032862 A1 | 2/2004 | Schoeneberger et al. | |
| 2004/0032935 A1 | 2/2004 | Mills et al. | |
| 2004/0042592 A1 | 3/2004 | Knott et al. | |
| 2004/0044950 A1 | 3/2004 | Mills et al. | |
| 2004/0066401 A1 | 4/2004 | Bushey et al. | |
| 2004/0066416 A1 | 4/2004 | Knott et al. | |
| 2004/0073569 A1 | 4/2004 | Knott et al. | |
| 2004/0083479 A1 | 4/2004 | Bondarenko et al. | |
| 2004/0088285 A1 | 5/2004 | Martin et al. | |
| 2004/0103017 A1 | 5/2004 | Reed et al. | |
| 2004/0109555 A1 | 6/2004 | Williams | |
| 2004/0125937 A1 | 7/2004 | Turcan et al. | |
| 2004/0125938 A1 | 7/2004 | Turcan et al. | |
| 2004/0125940 A1 | 7/2004 | Turcan et al. | |
| 2004/0161078 A1 | 8/2004 | Knott et al. | |
| 2004/0161094 A1 | 8/2004 | Martin et al. | |
| 2004/0161096 A1 | 8/2004 | Knott et al. | |
| 2004/0174980 A1 | 9/2004 | Knott et al. | |
| 2004/0230438 A1 | 11/2004 | Pasquale et al. | |
| 2004/0240635 A1 | 12/2004 | Bushey et al. | |
| 2004/0243568 A1 | 12/2004 | Wang et al. | |
| 2005/0008141 A1 | 1/2005 | Kortum et al. | |
| 2005/0015197 A1 | 1/2005 | Ohtsuji et al. | |
| 2005/0015744 A1 | 1/2005 | Bushey et al. | |
| 2005/0018825 A1 | 1/2005 | Ho | |
| 2005/0027535 A1 | 2/2005 | Martin et al. | |
| 2005/0041796 A1 | 2/2005 | Joseph et al. | |
| 2005/0047578 A1 | 3/2005 | Knott et al. | |
| 2005/0055216 A1 | 3/2005 | Bushey et al. | |
| 2005/0058264 A1 | 3/2005 | Joseph et al. | |
| 2005/0075894 A1 | 4/2005 | Bushey et al. | |
| 2005/0078805 A1 | 4/2005 | Mills et al. | |
| 2005/0080630 A1 | 4/2005 | Mills et al. | |
| 2005/0080667 A1 | 4/2005 | Knott et al. | |
| 2005/0125232 A1* | 6/2005 | Gadd ..................... 704/270.1 | |
| 2005/0131892 A1 | 6/2005 | Knott et al. | |
| 2005/0132262 A1 | 6/2005 | Bushey et al. | |
| 2005/0135595 A1 | 6/2005 | Bushey et al. | |
| 2005/0141692 A1 | 6/2005 | Scherer et al. | |
| 2005/0147218 A1 | 7/2005 | Novack et al. | |
| 2005/0169441 A1* | 8/2005 | Yacoub et al. ........... 379/88.16 | |
| 2005/0169453 A1 | 8/2005 | Knott et al. | |
| 2005/0201547 A1 | 9/2005 | Burg et al. | |
| 2005/0240411 A1* | 10/2005 | Yacoub ..................... 704/270 | |
| 2006/0018443 A1 | 1/2006 | Knott et al. | |
| 2006/0023863 A1 | 2/2006 | Joseph et al. | |
| 2006/0026049 A1 | 2/2006 | Joseph et al. | |
| 2006/0036437 A1 | 2/2006 | Bushey et al. | |
| 2006/0039547 A1 | 2/2006 | Klein et al. | |
| 2006/0050865 A1 | 3/2006 | Kortum et al. | |
| 2006/0056406 A1 | 3/2006 | Bouchard et al. | |
| 2006/0062375 A1 | 3/2006 | Pasquale et al. | |
| 2006/0072737 A1 | 4/2006 | Paden et al. | |
| 2006/0100998 A1 | 5/2006 | Edwards et al. | |
| 2006/0109974 A1 | 5/2006 | Paden et al. | |
| 2006/0115070 A1 | 6/2006 | Bushey et al. | |
| 2006/0126808 A1 | 6/2006 | Dallessandro et al. | |
| 2006/0126811 A1 | 6/2006 | Bushey et al. | |
| 2006/0133587 A1 | 6/2006 | Bushey et al. | |
| 2006/0153345 A1 | 7/2006 | Bushey et al. | |
| 2006/0159240 A1 | 7/2006 | Bushey et al. | |
| 2006/0161431 A1 | 7/2006 | Bushey et al. | |
| 2006/0165066 A1 | 7/2006 | Campbell et al. | |
| 2006/0177040 A1 | 8/2006 | Mitra | |
| 2006/0188087 A1 | 8/2006 | Kortum et al. | |
| 2006/0195312 A1 | 8/2006 | Knight et al. | |
| 2006/0198505 A1 | 9/2006 | Kortum et al. | |
| 2006/0215831 A1 | 9/2006 | Knott et al. | |
| 2006/0215833 A1 | 9/2006 | Mahoney et al. | |
| 2006/0256932 A1 | 11/2006 | Bushey et al. | |
| 2006/0291642 A1 | 12/2006 | Bushey et al. | |
| 2007/0019800 A1 | 1/2007 | Bushey et al. | |
| 2007/0025528 A1 | 2/2007 | Knott et al. | |
| 2007/0047718 A1 | 3/2007 | Idler et al. | |

FOREIGN PATENT DOCUMENTS

| | | |
|---|---|---|
| EP | 0 424 015 A3 | 4/1991 |
| EP | 0 424 015 B1 | 4/1991 |
| EP | 0 876 652 A4 | 9/1996 |
| WO | WO 97/26612 | 7/1997 |
| WO | WO 01/37539 A2 | 5/2001 |
| WO | WO 01/37539 A3 | 5/2001 |
| WO | WO 2004/017584 | 2/2004 |
| WO | WO 2004/049222 A2 | 6/2004 |

OTHER PUBLICATIONS

U.S. Appl. No. 10/901,926, filed Jul. 28, 2004.
U.S. Appl. No. 10/901,925, filed Jul. 28, 2004.
U.S. Appl. No. 10/917,233, filed Aug. 12, 2004.
U.S. Appl. No. 10/935,726, filed Sep. 7, 2004.
U.S. Appl. No. 10/999,199, filed Nov. 29, 2004.
U.S. Appl. No. 11/005,498, filed Dec. 6, 2004.
U.S. Appl. No. 11/005,494, filed Dec. 6, 2004.
U.S. Appl. No. 11/010,633, filed Dec. 13, 2004.
U.S. Appl. No. 11/032,495, filed Jan. 10, 2005.
U.S. Appl. No. 11/036,204, filed Jan. 14, 2005.
U.S. Appl. No. 11/036,201, filed Jan. 14, 2005.
U.S. Appl. No. 11/062,100, filed Feb. 18, 2005.
U.S. Appl. No. 11/071,068, filed Mar. 3, 2005.
U.S. Appl. No. 11/086,796, filed Mar. 23, 2005.
U.S. Appl. No. 11/129,051, filed May 13, 2005.
U.S. Appl. No. 11/145,513, filed Jun. 3, 2005.
U.S. Appl. No. 11/173,227, filed Jul. 1, 2005.
U.S. Appl. No. 11/176,972, filed Jul. 7, 2005.
U.S. Appl. No. 11/086,794, filed Mar. 22, 2005.
U.S. Appl. No. 10/996,127, filed Nov. 23, 2004.
U.S. Appl. No. 10/920,719, filed Dec. 13, 2004.
U.S. Appl. No. 10/920,720, filed Aug. 18, 2004.
U.S. Appl. No. 10/948,089, filed Sep. 23, 2004.
U.S. Appl. No. 10/975,023, filed Oct. 27, 2004.
U.S. Appl. No. 11/212,939, filed Aug. 25, 2005.
Ogino, Tsukasa, et al., "Technologies for Internet Infrastructure: Eliminating the World Wide Wait", iNet Japan, Jul. 18-21, 2000, www.isoc.org/edproceedings/1g/index.
www.yahoo.com (as in Dec. 12, 1998) as archived in the Internet archive (www.archive.org).

* cited by examiner

SYSTEM AND METHOD FOR IDENTIFYING TELEPHONE CALLERS

FIELD OF THE DISCLOSURE

The present disclosure relates generally to call center systems.

BACKGROUND

Telephone service providers of the public switched telephone network (PSTN) have been offering caller identification services that utilize the signaling system seven (SS7) protocol for many years. Since the early 1980's, various interactive voice response (IVR) technologies have been developed to use the caller identification function provided by SS7 to determine the originating line from which a telephone call was made. However, caller identification services only provide the telephone number from which the telephone call was initiated and the name(s) associated with the telephone number if the subscriber allows the telephone phone number to be listed. In order to determine who is calling, an IVR system or human customer service agent, must ask the caller to identify himself or herself.

Accordingly, there is a need for an improved system and method for identifying telephone callers.

BRIEF DESCRIPTION OF THE DRAWINGS

The present invention is pointed out with particularity in the appended claims. However, other features are described in the following detailed description in conjunction with the accompanying drawings in which:

DETAILED DESCRIPTION OF THE DRAWINGS

Figure 1:
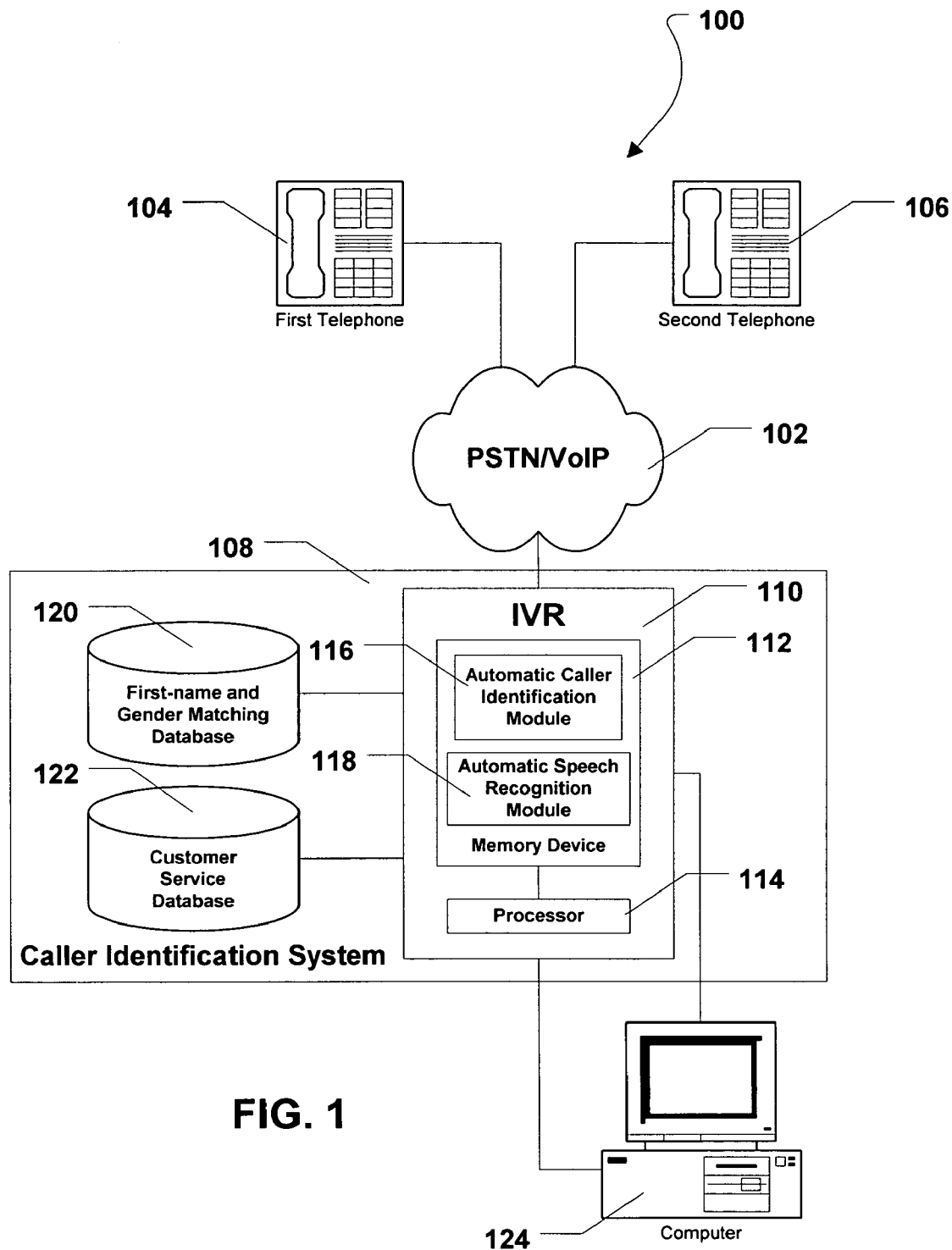
FIG. 1 is a general diagram of a telephone system.

A method of processing calls received at an interactive voice response (IVR) server is provided and includes receiving a telephone call at the IVR. Caller identity data that is associated with the telephone call is received and a customer profile that includes a list of individual names associated with the caller identity data is received. Each of the individual names is mapped to a speech recognition grammar pattern. Further, a caller of the telephone call is prompted to speak their name. A spoken name from the caller is received and recorded. Moreover, the spoken name is converted into a speech recognition grammar pattern. Thereafter, the speech recognition grammar pattern associated with the spoken name is compared to each of the speech recognition grammar patterns associated with the individual names retrieved from the customer profile.

In a particular embodiment, the caller identity data includes a telephone number. Also, in a particular embodiment, a caller name is identified based on a result of comparing the speech recognition grammar associated with the spoken name with each of the speech recognition grammar patterns associated with the individual names retrieved from the customer profile. Moreover, a title for the caller is determined based on the spoken name. In a particular embodiment, the title is determined based on a pitch of a voice of the caller and the pitch is derived from a recorded spoken name.

In still another particular embodiment, the method includes determining whether the probability that the title and the caller name are correct is above a predetermined threshold. The telephone call can be forwarded to a service agent terminal via a whisper transfer when the probability is below the predetermined threshold. In a particular embodiment, a name field can be automatically populated at a graphical user interface of an agent terminal with the caller name. Also, a title field can be automatically populated at the graphical user interface with the title of the caller. Additionally, the telephone call can be forwarded to a live customer service agent when the probability is above the predetermined threshold.

In another embodiment, a method of processing calls that are received at an interactive voice response (IVR) server is provided. Initially, a telephone call is received at the IVR and a caller is prompted to speak their name. Further, a spoken name is received from the caller. Based on the spoken name from the caller, a name of the caller is identified. Also, a title associated with the caller is determined.

In yet another embodiment, a system for identifying a telephone caller is provided. The system includes an interactive voice response server that includes a processor. A memory is accessible to the processor and a computer program is embedded within the memory. The computer program includes instructions to identify a name associated with a telephone caller in response to analyzing a recorded spoken name from the telephone caller. Additionally, the computer program includes instructions to determining a title associated with the caller based on the spoken name.

In still another embodiment, a graphical user interface of a customer service agent computer is provided. The graphical user interface includes a title field and the title field is automatically populated with a title of a telephone caller when a call is received at an interactive voice response server that is coupled to the customer service agent computer and forwarded to a customer service agent.

Referring initially to FIG. 1, a telecommunications system is shown and is generally designated 100. As shown, the system 100 includes a telecommunications network 102. In a particular embodiment, the telecommunications network 102 is a public switched telephone network. In another embodiment, the telecommunications network 102 is a voice over Internet protocol (VoIP) network. As illustrated in FIG. 1, a first telephone 104 and a second telephone 106 are coupled to the telecommunications network 102. FIG. 1 also depicts a caller identification system 108 coupled to the telecommunications network 102. The first telephone 104 and the second telephone 106 are for illustrative purposes and many more telephones can be coupled, or otherwise connected, to the telecommunications network 102.

In a particular embodiment, as indicated in FIG. 1, the caller identification system 108 includes an interactive voice response (IVR) server 110. The IVR server 110 includes a memory device 112 and a processor 114 coupled to the memory device 112. In an illustrative embodiment, the IVR server 110 also includes an automatic caller identification module 116 that is embedded within the memory device 112. In a particular embodiment, the automatic caller identification module 116 can retrieve caller identification information related to calls received at the IVR server 110. FIG. 1 further depicts an automatic speech recognition module 118 that is embedded within the memory device 112 in the IVR server 110. The automatic speech recognition module 118 can be used to determine a caller's name and gender after a call is received at the IVR and after the caller is prompted to speak his or her name.

Still referring to FIG. 1, a first-name and gender matching database 120 is coupled to the IVR 110. In a particular embodiment, the first-name and gender matching database 120 includes information that can be used by the automatic speech recognition module 118 for determining the gender of a caller, e.g., based on the first name of the caller or the pitch of the caller's voice. FIG. 1 also shows a customer service database 122 that is coupled to the IVR 110. Particularly, the customer service database 122 can include customer information such as, account information, customer address information, etc.

As depicted in FIG. 1, a computer 124 can be coupled to the caller identification system 108. In a particular embodiment, the computer 124 can be a customer service agent computer or a customer service agent terminal. Further, in a particular embodiment, many more computers 124 can be coupled to the caller identification system 108 than the single computer 124 illustrated in FIG. 1.

Figure 2:
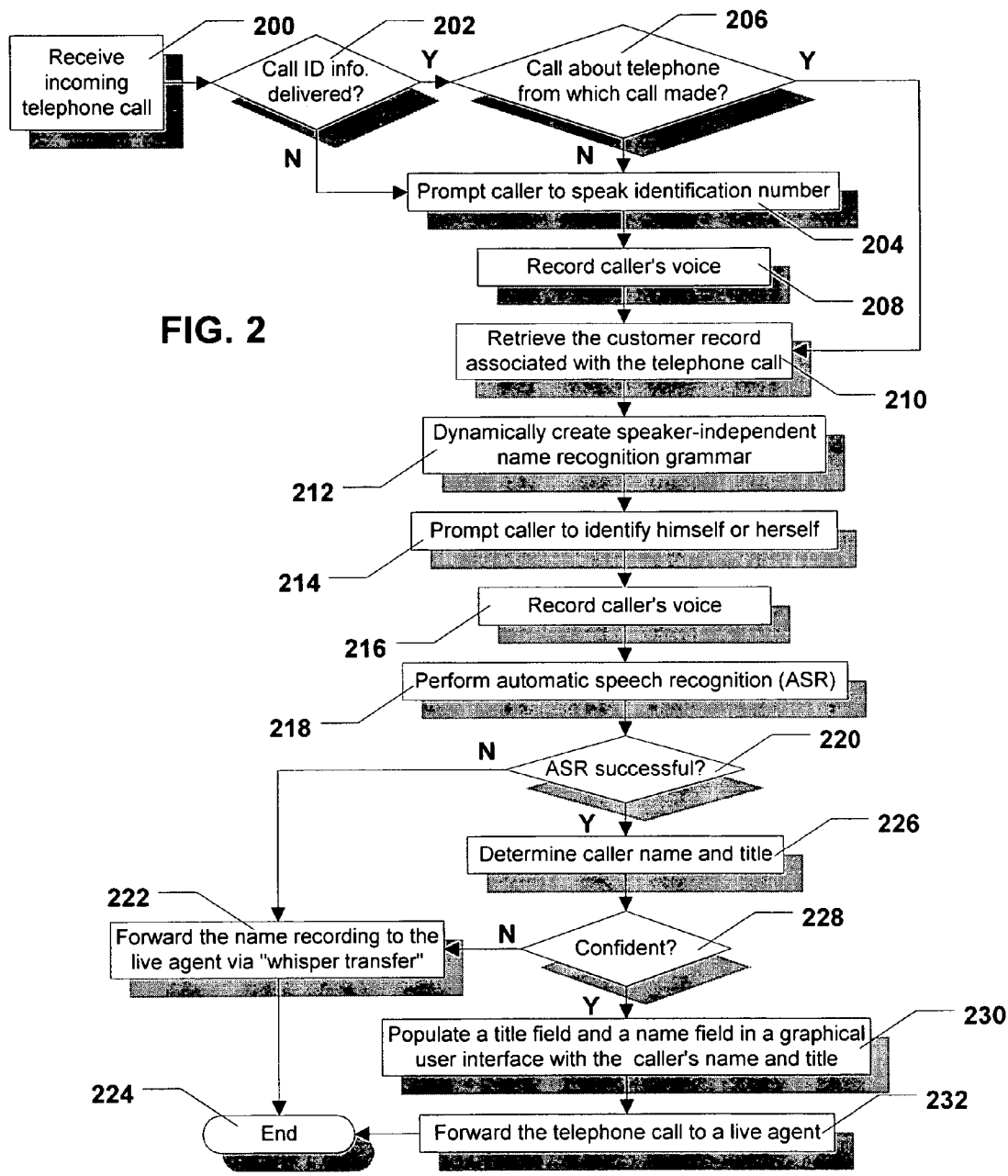
FIG. 2 is a flow chart to illustrate a method for identifying telephone callers.

Referring now to FIG. 2, a flow chart to illustrate a method for identifying telephone callers is shown and commences at block 200. At block 200, an incoming telephone call is received. At decision step 202, a determination is made as to whether caller identification information is delivered with the incoming telephone call. If caller identification information is not delivered with the incoming telephone call, the method moves to block 204 and the caller is prompted to speak an identification number. In a particular embodiment, the identification number can be a telephone number, an account number, a social security number, or any other number linked to a customer's account for identification purposes. From block 204, the method can move to block 208.

Returning to decision step 202, if the caller identification information is delivered, the method continues to decision step 206. At decision step 206, a determination is made as to whether the present call is about the telephone number identified in the caller identification information. For example, the present call can be a service call concerning the identified telephone number and the present call can be made from the telephone or location associated with the identified telephone number. If the present call is not about the identified telephone number, the method continues to block 204 and the caller is prompted to speak an identification number. Next, at block 208, the caller's voice is recorded. The method can then proceed to block 210.

Returning to decision step 206, if the call is about the identified telephone number, the method moves to block 210. At block 210, a customer record associated with the identified telephone number is retrieved. In a particular embodiment, the customer record can be retrieved from the customer service database 122 (FIG. 1). Moving to block 212, a speaker-independent name recognition grammar is dynamically created. In a particular embodiment, the name recognition grammar is a phonetic spelling of the user's name. Next, at block 214, the caller is prompted to identify himself or herself. Further, at block 216, the caller's voice is recorded while he or she is identifying himself or herself.

Continuing to block 218, automatic speech recognition is performed on the recorded voice. In a particular embodiment, the automatic speech recognition is performed in the automatic speech recognition module 118 within the IVR server 110. Further, in a particular embodiment, the automatic speech recognition module 118 measures the pitch of the speaker's voice in order to determine the gender of the speaker. Additionally, the automatic speech recognition module 118 attempts to recognize the spoken name by comparing the dynamically created name grammar to a table of names. In a particular embodiment, the table of names can be a comprehensive table of names. In another particular embodiment, the table of names corresponds to the names associated with a particular account, e.g., a husband name and a wife name. In a particular embodiment, the table of names can be a comprehensive table of names. In another particular embodiment, the table of names corresponds to the names associated with a particular account, e.g., a husband name and a wife name.

Moving to decision step 220, a decision is made in order to determine whether the automatic speech recognition is performed successfully, i.e., whether the automatic speech recognition module recognizes the name spoken. If the automatic speech recognition is not performed successfully, the method moves to block 222 and the name recording is forwarded to a customer service agent via a "whisper transfer" so that the customer service agent can hear the name recording and greet the caller using the recorded name. In a particular embodiment, during the "whisper transfer," the caller is placed in hold and the IVR connects to an available customer service agent. Then, the recorded name is played to the customer service agent before the call is transferred to the customer service agent. The customer service agent can listen to the recorded name and compare it to a name in a name field, if present, to determine the appropriate greeting for the caller. The method then ends at state 224.

At decision step 220, if the automatic speech recognition is performed successfully, the method proceeds to block 226 and the caller's name and title is determined. In a particular embodiment, the spelling of the caller's name can be determined. Particularly, the name and title can be determined by comparing the text string corresponding to the recorded name, e.g., the dynamically created recognition grammar, to a list of names. Further, to determine a caller's title, a gender table including common first names is used to determine if a name recognized by the automatic speech recognition module is most likely associated with a male or female caller. If a match is found, the title information obtained from the gender table is assigned to the name. If an initial match is not found, pitch characteristics of the voice recording are used to attempt to determine the gender of the caller.

Moving to decision step 228, a decision is made in order to determine whether the gender determination is accurate within a predetermine probability. If not, the method continues to block 222 and the telephone call is transferred to a customer service agent using a "whisper transfer." The customer service agent can compare the voice recording to the text of the name that appears in a GUI. The customer service agent can decide the gender of the caller and greet the caller appropriately. If the gender determination is deemed to be accurate above a certain probability, the method proceeds to block 230 and a name field and a title field in a GUI are automatically populated with the caller's name and title. Further, an address field, an account number field, and an account type field can be automatically populated. Moving to block 232, the telephone call is forwarded to a live agent. Then, the method ends at state 224.

Figure 3:
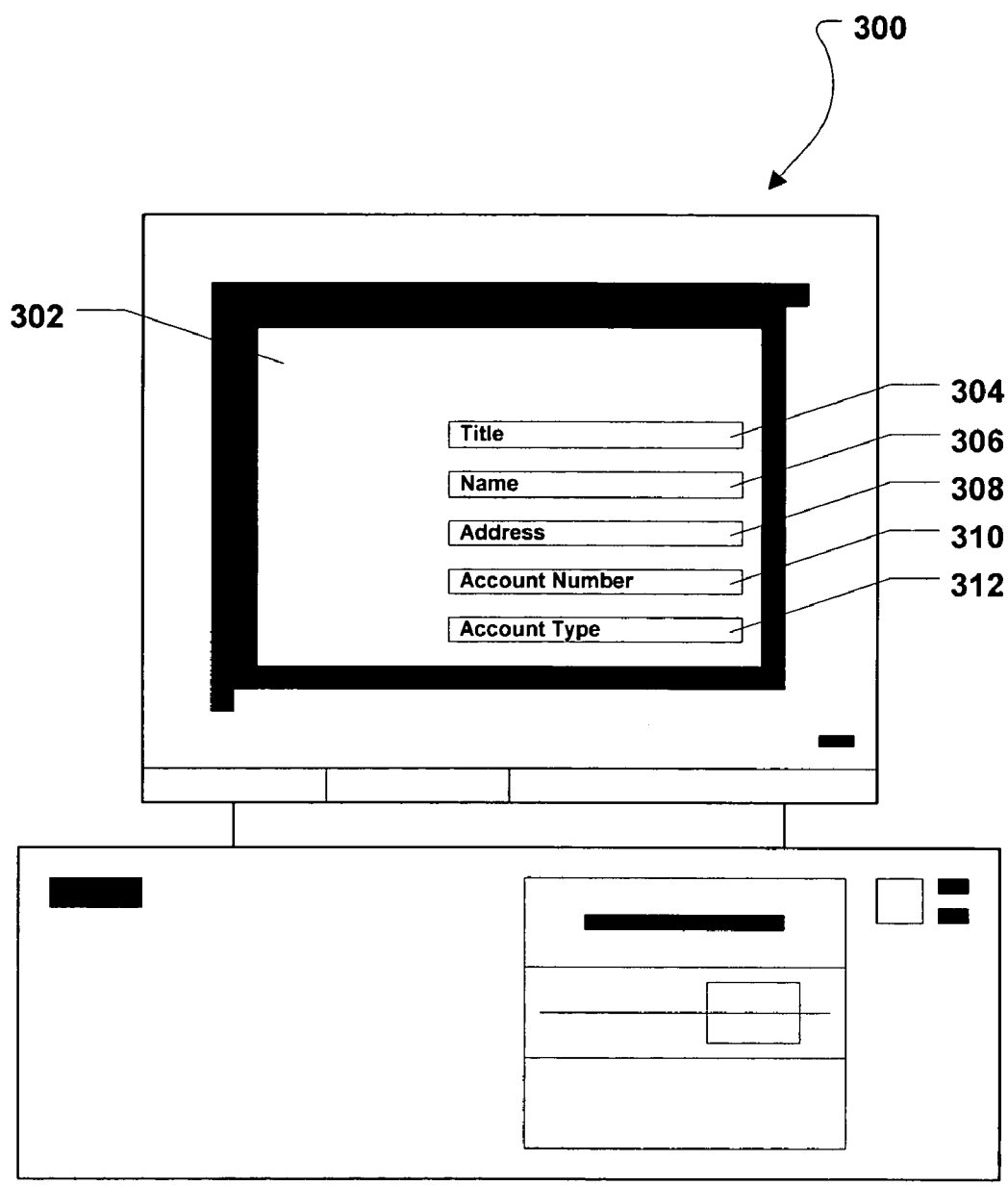
FIG. 3 is a general diagram of a computer.

Referring now to FIG. 3, a computer configured to support a customer service agent is shown and is generally designated 300. As illustrated in FIG. 3, a GUI 302 can be displayed at the computer 300. In a particular embodiment, the GUI 302 can include a title field 304, a name field 306, an address field 308, an account number field 310, and an account type field 312. In a particular embodiment, the title field 304 and the name field 306 can be automatically populated, as described herein, in order to present a caller's name and title to a customer service agent using the computer 300. The remaining fields 308, 310, 312 can be populated with information retrieved from the customer service database 122.

With the configuration of structure described herein, the system and method provides a way for a customer service agent to appropriately greet a caller who is calling regarding a particular telephone number. The telephone call may concern account information, repair information, and/or the addition of services to an account. Further, the system and method automates the task of asking a caller his or her name, eliminates the need for the customer agent to ask who is calling, and reduces the time that a customer agent service must spend on the phone with callers. Additionally, the system and method can provide improved accuracy for determining a user's name and gender.

For many types of services, e.g., local telephone service, long distance telephone services, Internet-based services, multiple users may initiate a customer service call at different times for the same account. In this type of scenario, the system and method described herein can determine who among the users associated with an account is calling and greet the caller appropriately.

The above-disclosed subject matter is to be considered illustrative, and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method of processing calls received at an interactive voice response (IVR) server, the method comprising:
   receiving a telephone call at the IVR server;
   receiving caller identity data associated with the telephone call and receiving a text list of names of individuals associated with the caller identity data;
   dynamically creating multiple name recognition grammar patterns by generating a phonetic spelling of each name in the text list of names of individuals associated with the caller identity data;
   prompting a caller of the telephone call to speak a name associated with the caller;
   receiving and recording a spoken name from the caller;
   converting the spoken name into a speech recognition grammar pattern;
   selectively comparing the speech recognition grammar pattern associated with the spoken name to the multiple name recognition grammar patterns;
   determining a text string from the text list of names of individuals associated with the caller identity data corresponding to a name recognition grammar pattern that matches the speech recognition grammar pattern;
   comparing the text string to entries in a table to determine a gender of the caller, the table including a plurality of first names and an associated indication that a particular first name indicates the caller is one of a male caller and a female caller;
   assigning a title to the caller based on the gender of the caller when the text string matches an entry in the table; and
   forwarding the telephone call and the title to a service agent terminal.

2. The method of claim 1, wherein the caller identity data includes a telephone number.

3. The method of claim 1, further comprising:
   identifying a caller name at least partially based on a result of the selective comparison.

4. The method of claim 3, further comprising determining whether a probability that the title and the caller name are correct is above a predetermined threshold.

5. The method of claim 4, further comprising populating a name field at a graphical user interface of the service agent terminal with the caller name when the probability that the title and the caller name are correct is above the predetermined threshold.

6. The method of claim 5, further comprising populating a title field at the graphical user interface with the title of the caller.

7. The method of claim 5, further comprising forwarding the telephone call to a live customer service agent.

8. A method of processing calls received at an interactive voice response (IVR) server, the method comprising:
   receiving a telephone call at the IVR server;
   prompting a caller to speak a name associated with the caller;
   receiving and recording a spoken name from the caller;
   converting the spoken name into a speech recognition grammar pattern;
   identifying a name of the caller based on a comparison between the speech recognition grammar pattern and at least one name recognition grammar pattern that is dynamically created by generating a phonetic spelling of a name in a text list of names of individuals associated with a telephone number from which the telephone call was initiated, the text list obtained from a customer service database;
   determining a text string associated with the name of the caller from the text list;
   comparing the text string to entries in a table to determine a gender of the caller, the table including a plurality of first names and an associated indication that a particular first name indicates the caller is one of a male caller and a female caller;
   assigning a title to the caller based on the gender of the caller when the text string matches an entry in the table and displaying the title and the name of the caller on a service agent terminal; and
   forwarding the telephone call, the name, and the title to the service agent terminal via a whisper transfer when a probability that the caller name is correct is determined to be below a predetermined threshold.

9. The method of claim 8, wherein the text string corresponds to a spelling of the name associated with the caller.

10. The method of claim 9, further comprising forwarding the telephone call to a customer service agent computer when the caller name is likely to be correct.

11. The method of claim 10, further comprising populating a name field at a graphical user interface displayed at the customer service agent computer with the identified name of the caller.

12. The method of claim 10, further comprising populating a title field at a graphical user interface displayed at the customer service agent computer with the title.

13. A system for identifying a telephone caller, the system comprising:
   an interactive voice response server including a processor;
   a memory accessible to the processor; and
   a computer program embedded within the memory, the computer program comprising:
      instructions to identify a name associated with a telephone caller by:
         converting a recorded spoken name from the telephone caller into a speech recognition grammar pattern; and
         comparing the speech recognition grammar pattern to at least one name recognition grammar pattern that is dynamically created by generating a phonetic spelling of a name in a text list of names of individuals associated with a telephone number that initiated a received call, the text list obtained from a customer service database;
instructions to determine a title associated with the telephone caller by:
  determining a text string associated with the name associated with the telephone caller from the text list;
  comparing the text string to entries in a table to determine a gender of the telephone caller, the table including a plurality of first names and an associated indication that a particular first name indicates the caller is one of a male caller and a female caller; and
  assigning the title to the telephone caller based on the gender of the telephone caller when the text string matches an entry in the table; and
instructions to forward the title and a telephone call associated with the telephone caller to a service agent terminal.

14. The system of claim 13, wherein the text string corresponds to a spelling of the name associated with the telephone caller.

15. The system of claim 14, further comprising a customer service agent computer coupled to the interactive voice response server.

16. The system of claim 13, wherein the computer program further comprises instructions to forward the telephone call to a customer service agent computer.

17. The system of claim 16, wherein the computer program further comprises instructions to automatically populate a name field at a graphical user interface displayed at the customer service agent computer with the name associated with the telephone caller, when a probability that the title and the name associated with the telephone caller are correct is above a predetermined threshold.

18. The system of claim 17, wherein the computer program further comprises instructions to automatically populate a title field of a graphical user interface displayed at the customer service agent computer with the title.

19. The method of claim 1, further comprising determining a title of the caller at least partially based on a pitch of a voice of the caller when the text string does not match any entry in the table, wherein the pitch is derived from a recording of the spoken name.

20. The method of claim 8, further comprising determining a title of the caller at least partially based on a pitch of a voice of the caller when the text string does not match any entry in the table, wherein the pitch is derived from a recording of the spoken name.

21. The system of claim 13, wherein the instructions further comprise instructions to determine the title associated with the telephone caller at least partially based on a pitch of a voice of the telephone caller when the text string does not match any entry in the table, wherein the pitch is derived from the recorded spoken name.

* * * * *